United States Patent
Dube et al.

(10) Patent No.: US 8,690,992 B2
(45) Date of Patent: Apr. 8, 2014

(54) LOW PRESSURE STRIPPING IN A GAS PURIFICATION PROCESS AND SYSTEMS THEREOF

(71) Applicant: Alstom Technology LTD, Baden (CH)

(72) Inventors: Sanjay Kumar Dube, Knoxville, TN (US); Daniel Nicolaus Secundus Mattstedt, Hamburg (DE); Joseph P. Naumovitz, Lebanon, NJ (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/847,148

(22) Filed: Mar. 19, 2013

(65) Prior Publication Data

US 2013/0213224 A1     Aug. 22, 2013

Related U.S. Application Data

(62) Division of application No. 13/299,009, filed on Nov. 17, 2011, now Pat. No. 8,470,077.

(51) Int. Cl.
*B01D 53/14* (2006.01)

(52) U.S. Cl.
USPC ............ 95/165; 95/166; 95/168; 95/191; 95/193; 95/207; 95/209; 95/227; 95/228; 95/232

(58) Field of Classification Search
None
See application file for complete search history.

(56) References Cited

U.S. PATENT DOCUMENTS

| | | | |
|---|---|---|---|
| 2,785,045 A * | 3/1957 | Barr et al. | 423/229 |
| 3,107,149 A * | 10/1963 | Nisbet, Jr. et al. | 564/67 |
| 3,563,696 A * | 2/1971 | Benson | 423/223 |
| 4,002,565 A | 1/1977 | Farrell et al. | |
| 4,381,926 A | 5/1983 | Karwat et al. | |
| 6,531,104 B1 | 3/2003 | Borio et al. | |
| 7,846,240 B2 | 12/2010 | Gal et al. | |
| 7,862,788 B2 | 1/2011 | Gal et al. | |
| 7,867,322 B2 | 1/2011 | Gal et al. | |
| 2008/0307968 A1 | 12/2008 | Kang et al. | |
| 2010/0107875 A1 | 5/2010 | Koss et al. | |
| 2010/0132563 A1 | 6/2010 | Pan et al. | |
| 2010/0242731 A1 | 9/2010 | Baburao et al. | |
| 2011/0067567 A1 | 3/2011 | Kozak et al. | |
| 2011/0068585 A1 | 3/2011 | Dube et al. | |
| 2011/0100216 A1 | 5/2011 | Kozak et al. | |
| 2012/0063975 A1 | 3/2012 | Koss et al. | |
| 2012/0180521 A1 | 7/2012 | Erickson | |
| 2012/0207658 A1 | 8/2012 | Dube et al. | |

FOREIGN PATENT DOCUMENTS

| | | |
|---|---|---|
| EP | 0 461 385 | 12/1991 |
| EP | 2 230 000 | 9/2010 |
| WO | 2006022885 A1 | 3/2006 |

OTHER PUBLICATIONS

The International Search Report and the Written Opinion of the International Search Authority for PCT/IB2012/056257 dated Mar. 1, 2013.

* cited by examiner

*Primary Examiner* — Duane Smith
*Assistant Examiner* — Pankti Patel
(74) *Attorney, Agent, or Firm* — Rober D. Crawford

(57) ABSTRACT

Processes for operating an ammonia stripper at a low pressure in a gas purification system include providing a first side-draw stream from the ammonia stripper; heating the first side-draw stream with a second side-draw stream from a regenerator; providing a stripper offgas stream from the ammonia stripper to a stripper overhead condenser; and utilizing the stripper offgas stream as a heat source for a regenerating system fluidly coupled to the stripper overhead condenser. Also disclosed are systems for implementing the processes.

6 Claims, 5 Drawing Sheets

LOW PRESSURE STRIPPING IN A GAS PURIFICATION PROCESS AND SYSTEMS THEREOF

CROSS REFERENCE TO RELATED APPLICATIONS

This application is a DIVISIONAL application of and claims priority to U.S. application Ser. No. 13/299,009, filed on Nov. 17, 2011, incorporated herein by reference in its entirety.

BACKGROUND

The present disclosure generally relates to gas purification systems and processes of use. More particularly, the present disclosure relates to the low pressure ammonia recovery in the gas purification systems.

In conventional industrial technologies for gas purification, impurities, such as $H_2S$, $CO_2$ and/or COS are removed from a gas stream such as flue gas, natural gas, syngas or other gas streams by absorption in a liquid solution, e.g., in a liquid solution comprising ammonia and/or one or more amine compounds.

Used liquid solution is subsequently regenerated in a regenerator column to release the impurities comprised in the solution, typically by countercurrent contacting with steam. The steam needed for regeneration is typically produced in the power plant turbine system. In addition, reboiling may provide further release of impurities comprised in the liquid solution.

In conventional absorption-regeneration processes as described above, regenerated and reboiled liquid solution are typically re-used in another absorption cycle. The reboiled solution may, however, have a temperature as high as 100-200 degrees Celsius (° C.). To enable efficient absorption, the liquid absorbent solutions typically requires cooling before being passed to another round of absorption. Cooling has conventionally been accomplished by heat-exchange with the used liquid solution from absorption.

In general, the energy requirements of a conventional gas purification process are of three types: binding energy, stripping energy and sensible heat. Binding energy is required for breaking the chemical bond formed between the impurities and the liquid solution, whereas stripping energy is required for production of the steam needed for releasing the impurities from the liquid solution. Sensible heat is in turn needed for heating of the liquid solution prior to regeneration. In conventional systems and processes, part of the produced energy may be lost, for example, in the system coolers, which reduce the temperature at specified locations in the system. Moreover, energy may be lost in condensers located at the top of the absorber, regenerator, and the like, and in the form of water vapor exiting the process, mostly at the top of the regenerator where water vapor is present in the purified carbon dioxide gas.

Thus, gas removal, and in particular regeneration, is an energy intensive process. As such, reduction of energy requirements at different parts of the gas purification process could potentially reduce the total energy required by the process. While various improvements of conventional gas purification technologies are known, there remains a need to further improve gas purification systems and processes, particularly with respect to reducing the energy consumption therein.

BRIEF SUMMARY

Disclosed herein are processes and systems for operating an ammonia stripper at a low pressure in a gas purification system. In one embodiment, the process includes providing a first side-draw stream from the ammonia stripper; heating the first side-draw stream with a second side-draw stream from a regenerator; providing a stripper offgas stream from the ammonia stripper to a stripper overhead condenser; and utilizing the stripper offgas stream as a heat source for a regenerating system fluidly coupled to the stripper overhead condenser.

In another embodiment, a process for operating an ammonia stripper in a gas purification system includes providing a first side-draw stream from the ammonia stripper; providing a condensate from a reboiler fluidly coupled to a regenerator; heating the first side-draw stream with the condensate in a side-reboiler fluidly coupled to the reboiler and the ammonia stripper; compressing a stripper offgas stream from the ammonia stripper; providing the compressed stripper offgas stream to a stripper overhead condenser; and utilizing the compressed stripper offgas stream as a heat source for a regenerating system fluidly coupled to the stripper overhead condenser.

A system for regenerating an absorbent solution includes a regenerating system comprising a regenerator for regenerating a rich absorbent solution to form a lean absorbent solution in fluid communication with a reboiler and a heat exchanger network; a stripper for removing contaminants from an enriched absorber stream to form a stripper offgas stream in fluid communication with a side-reboiler, wherein the side reboiler is configured to exchange heat between a first side-draw stream from the stripper and a second stream; and a stripper overhead condenser for exchanging heat between the stripper offgas stream and a cold stream in fluid communication with the stripper.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

FIG. ("FIG.") 1 schematically illustrates a gas purification system in accordance with an embodiment of the present invention.

DETAILED DESCRIPTION

Disclosed herein are systems and processes for purification of a gas stream, such as a flue gas. More particularly, the systems and processes are configured to minimize the energy penalties associated with the use of low pressure steam from the power plant in the ammonia stripper, which is typically found in the chilled ammonia process ("CAP") of a carbon capture system ("CCS").

Figure 1:
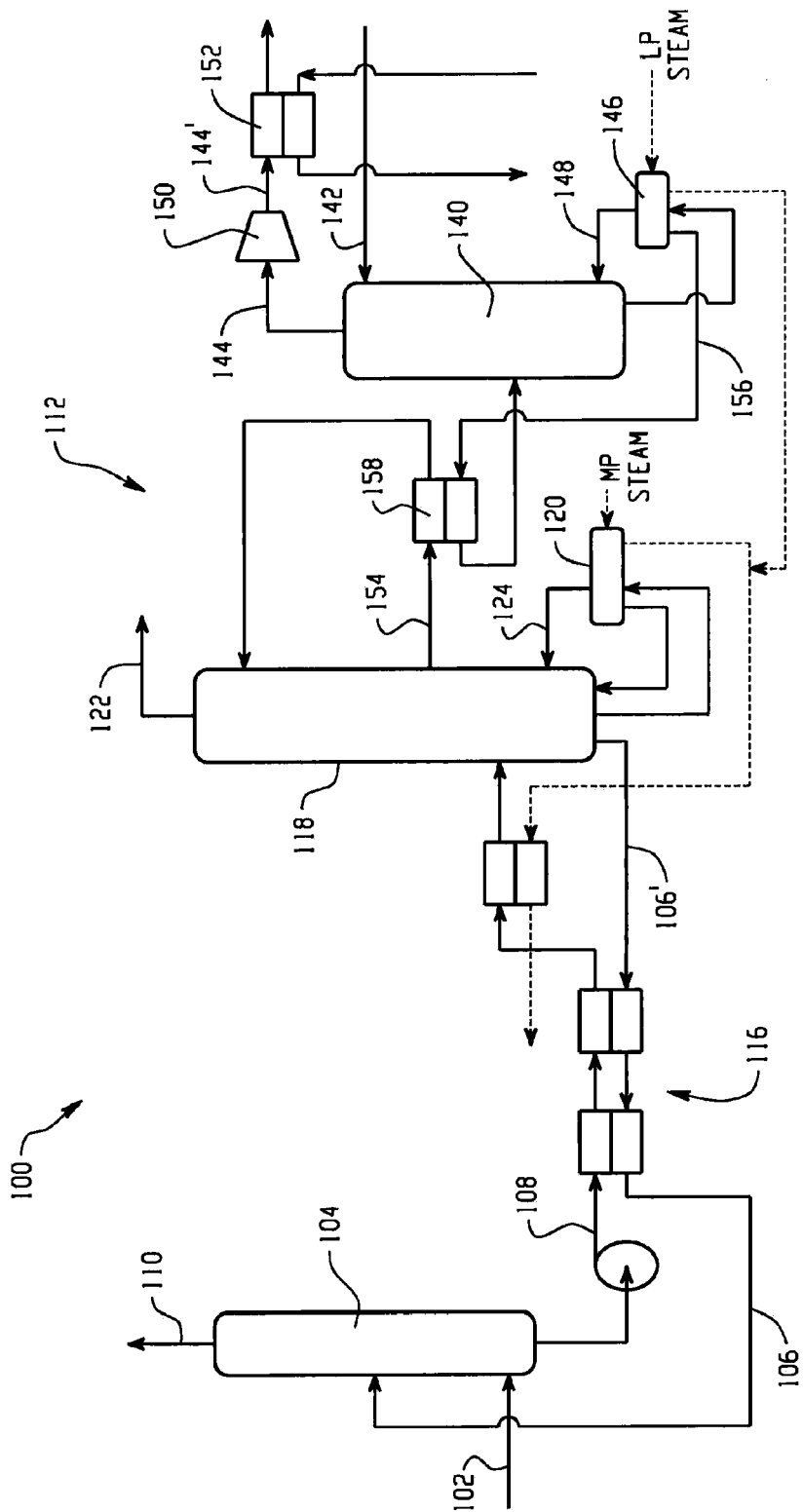

Referring now to FIG. 1, there is schematically illustrated a purification system 100 in accordance with one embodiment for absorbing an acidic component from a flue gas stream 102. The flue gas stream 102 may be any fluid stream such as, for example, natural gas streams, synthesis gas streams, refinery gas streams, output of petroleum reservoirs, or streams generated from combustion of materials such as coal, natural gas or other fuels. One example of process stream 102 is a flue gas stream generated by combustion of a fuel such as, for example, coal, and provided at an output of a combustion chamber of a fossil fuel fired boiler. Examples of other fuels include, but are not limited to natural gas, synthetic gas (syngas), and petroleum refinery gas. Depending on the type of or source of the process stream, the acidic component(s) may be in a gaseous, liquid or particulate form.

In one embodiment, the flue gas stream 102 contains several acidic components including, but not limited to, carbon dioxide. By the time the flue gas stream 102 enters an absorber 104, the flue gas stream 102 may have undergone treatment to remove particulate matter (e.g., fly ash), as well as sulfur oxides (SOx) and nitrogen oxides (NOx). However, processes may vary from system to system and therefore, such treatments may occur after the flue gas stream 102 passes through the absorber 104, or not at all.

The absorber 104 employs an absorbent solution (disposed therein) that facilitates the absorption and the removal of a gaseous component from the flue gas stream 102. In one embodiment, the absorbent solution includes a chemical solvent and water, where the chemical solvent contains, for example, a nitrogen-based solvent and, in particular, ammonia; primary, secondary and tertiary alkanolamines; primary and secondary amines; sterically hindered amines; and severely sterically hindered secondary aminoether alcohols. Examples of commonly used chemical solvents include, but are not limited to: monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy) ethanol, 2-(2-(1-methyl-1-ethylpropylamino)ethoxy) ethanol, and the like. The foregoing may be used individually or in combination, and with or without other co-solvents, additives such as anti-foam agents, promotors such as enzymes, buffers, metal salts and the like, as well as corrosion inhibitors.

In one embodiment, the absorbent solution present in the absorber 104 is referred to as a "lean" absorbent solution and/or a "semi-lean" absorbent solution 106. The lean and semi-lean absorbent solutions are capable of absorbing the acidic component(s) from the flue gas stream 102, e.g., the absorbent solutions are not fully saturated or at full absorption capacity. As described herein, the lean absorbent solution is more absorbent than the semi-lean absorbent solution. In one embodiment, described below, the lean and/or semi-lean absorbent solution 106 is provided by the system 100. In one embodiment, a make-up absorbent solution (not shown) is provided to the absorber 104 to supplement the system provided lean and/or semi-lean absorbent solution 102.

In another embodiment, system 100 employs a process, or technology, referred to as "the chilled ammonia process". In this embodiment, the absorbent solution in absorber 104 is a solution or slurry including ammonia. The ammonia can be in the form of ammonium ion, $NH_4^+$ or in the form of dissolved molecular $NH_3$. The absorption of the acidic component present in flue gas stream 102 is achieved when the absorber 104 is operated at atmospheric pressure and at a low temperature, for example, between zero and thirty degrees Celsius (0-30° C.). In another example, absorption of the acidic component from flue gas stream 102 is achieved when the absorber 104 is operated at atmospheric pressure and at a temperature between zero and ten degrees Celsius (0-10° C.).

Absorption of the acidic component(s) from the flue gas stream 102 occurs by contact between the lean and/or semi-lean absorbent solution 106 and the flue gas stream 102. As will be appreciated, contact between the flue gas stream 102 and the lean and/or semi-lean absorbent solution 106 can occur in any manner in absorber 104. In one example, the flue gas stream 102 enters a lower portion of absorber 104 and travels up a length of the absorber 104 while the lean and/or semi-lean absorbent solution 106 (e.g., an ammonia solution or slurry) enters the absorber 104 at a location above where the flue gas stream 102 enters the absorber 104, and the lean and/or semi-lean absorbent solution 106 flows in a countercurrent direction of the flue gas stream 102.

Contact within the absorber 104 between the flue gas stream 102 and the lean and/or semi-lean absorbent solution 106 produces a rich absorbent solution 108 containing the acid gas component from the lean or semi-lean absorbent solution 106. In one example, the rich absorbent solution 108 falls to the lower portion of absorber 104, where it is removed for further processing, while the flue gas stream 102 having a reduced amount of acidic component travels up a length of the absorber 104 and can be released as a cleansed stream 110 from a top portion of the absorber 104, if desired, or as described below the flue gas stream 102, after processing in the absorber 104, can be passed through second absorption stage for absorption of $NH_3$ present in the flue gas.

The rich absorbent solution 108 exits the absorber 104 at the bottom portion and is provided to a regenerating system shown generally at 112. The rich absorbent solution 108 may travel to the regenerating system 112 via a treatment train that includes, but is not limited to, flash coolers, various pumps and heat exchangers. In one example, prior to being provided to regenerating system 112, the pressure of the rich absorbent solution 108 can be elevated by one or more pumps to the range of thirty to five-hundred pounds per square inch (30-500 psi).

The regenerating system 112 includes, for example, several devices or sections, including, but not limited to, a regenerator 118 and a reboiler 120. The regenerator 118 regenerates the rich absorbent solution 108 by heating the solution to a temperature range of about fifty to about two hundred degrees Celsius (about 50-about 200° C.), thereby producing regenerated lean and/or semi-lean absorbent solution 106 as well as a stream of the acidic component 122. The stream of the acidic component 122 may be transferred to a compressing system (not shown), which condenses and, in some embodiments, compresses the acidic component for storage and further use. For reuse in the absorber 104, the regenerated lean and/or semi-lean absorbent 106' is cooled via the heat treatment network 116 (sometimes referred to as a "train" and including pumps, heat exchangers and the like) to the absorber 104 for further absorption of an acidic component from the flue gas stream 102.

As illustrated in FIG. 1, the reboiler 120 receives steam from the power plant and heats the process solutions. The heated vapor 124 enters to a lower portion of the regenerator 118 that heats the rich absorbent solution to a temperature effective to remove the acid component from the solution, e.g., carbon dioxide gas, thereby producing the regenerated lean and/or semi-lean absorbent solution 106', which is subsequently cooled via heat exchange in the treatment train prior to re-introduction into the absorber 104. Steam can come from outside the system 100 anywhere in the power plant, such as from the fossil fuel fired boiler-turbine system (not shown). Utilizing steam from elsewhere in the system as a heat source will reduce the energy requirements of the process to regenerate acidic components.

The system 100 further comprises an ammonia stripper 140. As mentioned above, after the flue gas stream 110 leaves the absorber 104, it can undergo further processing, such as absorption with a second absorption liquid configured to remove contaminants, such as $NH_3$, from the flue gas stream 110. This process results in a clean flue gas and a stream 142 enriched with $NH_3$ and other contaminants. The latter stream 142, enriched with at least $NH_3$, can be fed to the ammonia stripper 140. In the stripper 140, the $NH_3$-enriched stream 142 is heated at a temperature which lower boiling point contaminants may be transferred to the gas phase to form a stripper offgas stream 144, while higher boiling point contaminants remain in the liquid phase and may be recycled for use as absorption liquid. As further illustrated in FIG. 1, the system 100 uses the heat from the regenerator 118 to heat the stripper bottom stream 156 and boil off ammonia by using heat exchanger 158. The steam in the reboiler 146 may be required during plant start-up from the power plant turbine system. In normal operation, the heat from the regenerator 118 will be sufficient to recover ammonia from the stripper 140. The heat recovered from the regenerator 118 improves the overall heat balance of the system; otherwise if the regenerator overhead heat were not used in the stripper then it would be lost the regenerator cooler. It should be noted that the regenerator operates at much higher pressure and temperature than the stripper, and therefore, it provides an opportunity to integrate the heat, thereby considerably reducing the amount of steam required in the stripper considerably. In one embodiment, the stream 148 is the vapor stream generated by boiling off the process stream in the reboiler 146 (during start-up) or by side reboiler 158 (during normal operation). The stripper offgas stream 144 passes through a compressor 150 and a stripper overhead condenser 152 in order to condense the offgas stream and capture the heat therefrom for use in other areas of the system and/or power plant. The heat duty of the overhead stripper condenser 152 can, for example, be used within the pre-heater sequence of the regenerator 118 where the cold, rich absorbent solution 108 coming from absorber 104 is pre-heated before being fed into the regenerator column.

In some conventional gas purification systems, the ammonia stripper is operated under high pressure, utilizing high-pressure steam taken from the power plant to which the system 100 is attached. Significant energy penalties can be reduced, however, by lowering the pressure in the ammonia stripper 140 and, thus, the pressure of the condensing steam in the reboiler 146. In one embodiment, the ammonia stripper 140 can be configured to operate on low pressure (LP) steam, for example, steam having a pressure in the range of about 30 to about 120 psi. Alternatively, the stripper 140 may be operated in vacuum conditions and heated by low grade heat, such as "waste heat," instead of LP steam. However, as mentioned above, for effective heat integration and high efficiency of the system 100, the heat duty of the stripper overhead condenser 152 should be used in locations within the process where heat is required. When the ammonia stripper 140 is operated at low pressure, it reduces the boiling points of the liquid in the stripper column. Therefore, the temperatures in the stripper overhead condenser 152 are reduced, as are the process-side streams being heated by the condenser. In fact, at the optimal ammonia stripper pressure (e.g., pressure that provides low specific reboiler duty and permits usage of LP steam), the condensation temperature in the stripper overhead condenser 152 is too low to allow heat transfer to the rich solvent within any location of the pre-heater sequence of the regenerator 118. The heat duty of the condenser cannot, without additional equipment, be integrated within the system 100.

In light of this and with reference to the embodiment illustrated in FIG. 1, the ammonia stripper 140 of system 100 is a stand-alone stripper that is heated with LP steam. A side-draw stream 154 from the regenerator 118 is cooled down by a side-draw stream 156 from the stripper 140 in a side-reboiler 158. Thus, heat is transferred from the regenerator 118 to the stripper 140, representing a heat duty shift between the two components. The increase in heat of the stripper 140 from the side-draw reboiler 158 permits the use of LP steam while keeping the temperature in the stripper column high, such that the stripper offgas stream 144 is sufficiently hot to provide heat to other system streams via the stripper overhead condenser 152. In this embodiment, the heat of the stripper overhead condenser 152 is integrated into the water/steam cycle of the power plant.

Figure 2:
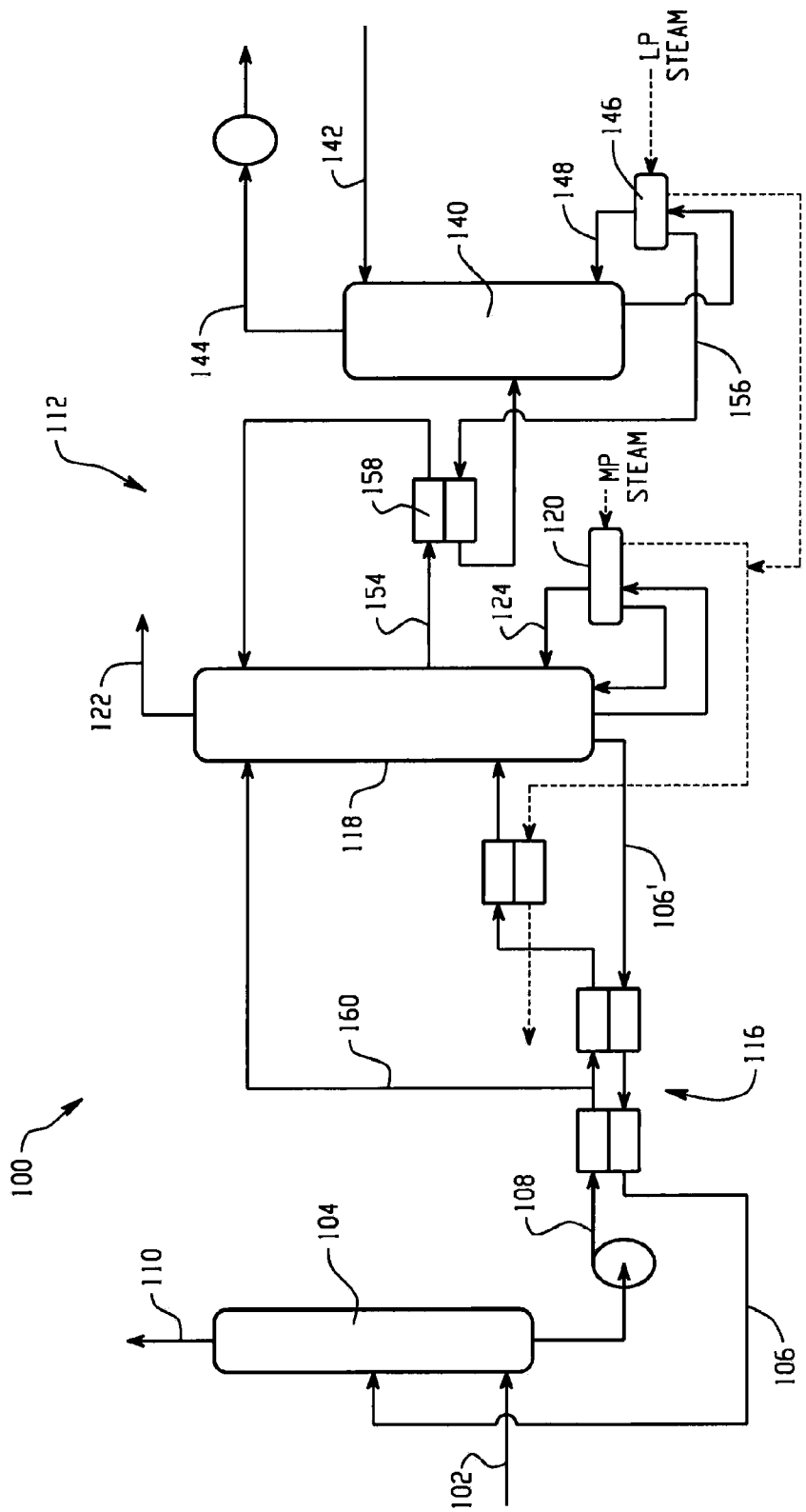
FIG. 2 schematically illustrates a gas purification system in accordance with another embodiment of the present invention.

Further, the duty shift between the regenerator 118 and the stripper 140 lowers the temperature of the stream of acidic component 122 leaving the top of the regenerator column. Normally, the gas stream 122 leaving the regenerator 118 has to be cooled as the high temperature of the stream promotes an excessive loss of ammonia therefrom. In order to minimize the slip of ammonia from the regenerator top, the stream 122 is cooled. Without the heat duty shift between the regenerator 118 and the stripper 140, a cold slip stream of the rich absorbent solution 108 is solely depended upon to cool the regenerator temperatures. As shown in FIG. 2, a slip stream 160 of the rich absorbent solution 108 is taken from a location in the heat exchanger network 116. When the slip stream 160 is depended upon entirely to cool the temperature of the stream 122, a significant portion (e.g., flow rate) of the rich absorbent solution 108 is not available in the remaining heat exchanger network 116. The heat recovery performance of the network 116, therefore, is reduced. The lower the flow rate of the slip stream 160, the higher the flow rate of the rich absorbent solution 108 through the heat exchanger network 116 and thus, the greater the amount of heat that can be recovered from the regenerated lean solution 106. As such, the duty shift provided by the side reboiler 158 permits a lower flow rate of the slip stream 160 than would otherwise be required and a greater flow rate of rich absorbent solution 108 is permitted to pass through the heat exchanger network 116 and improve the heat transfer performance thereof.

Figure 3:
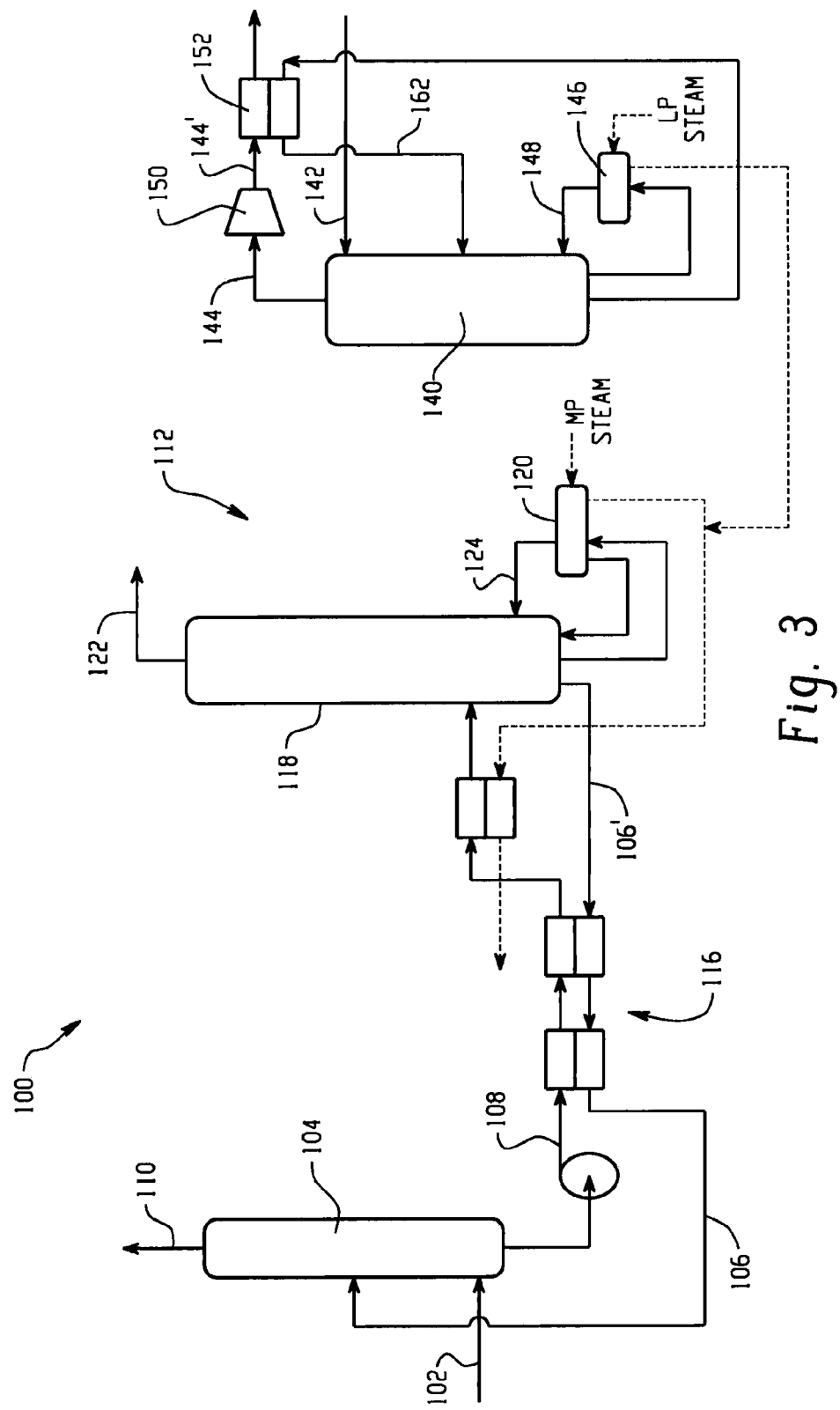
FIG. 3 schematically illustrates a gas purification system in accordance with an embodiment of the present invention FIG. 4 schematically illustrates a gas purification system in accordance with an embodiment of the present invention.

Turning now to FIG. 3 another embodiment of the purification system 100 is illustrated. In this embodiment, the compressor 150 is configured to compress the stripper offgas stream 144 to a pressure that permits condensation of the gases at a higher temperature. The compressor 150 discharge pressure is chosen such that the heat from the compressed stripper offgas stream 144' can be transferred to the desired stream (i.e., a cold stream) within the overall process (e.g., the gas purification system or the power plant). For example, the cold stream could be a stream within the regenerating system 118 or a boiler feed water stream of the power plant. In the embodiment illustrated in FIG. 3, however, the compressed stripper offgas stream 144' transfers heat back to the stripper 140 through the stripper overhead condenser 152. At a high pressure, e.g. a pressure significantly higher than the stripper column pressure, the condensation temperature in the stripper overhead condenser 152 is sufficiently high to transfer heat to the bottom of the stripper 140 column. Therefore, a side-draw 162 is taken from the stripper bottom, partly vaporized in the stripper overhead condenser 152 (acting as a stripper side-boiler simultaneously) and fed back to the stripper bottom as a heated stream. The heat duty of the stripper main reboiler 146 is thereby lowered and, as a result, the demand on heating the process stream is lowered. While this embodiment is illustrated in system 100 utilizing a low pressure stripper, it is to be understood that a stripper bottom side-draw from a high pressure stripper could also be heated by the compressed stripper offgas stream 144' in the stripper overhead condenser 152.

Figure 4:
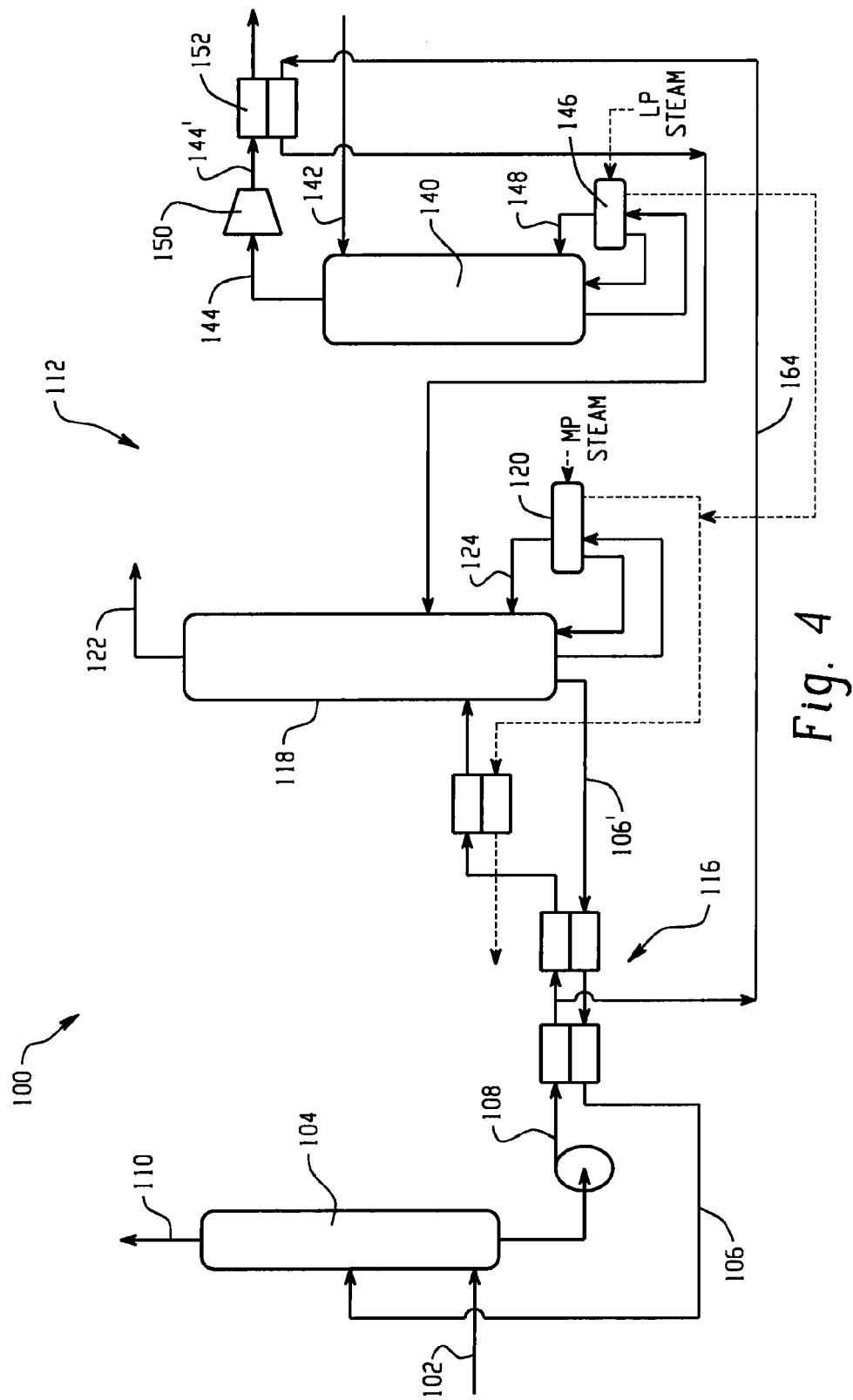

In FIG. 4, the cold stream applied to the stripper overhead condenser 152 is a slip stream 164 of the rich absorbent solution 108. The stripper overhead condenser 152 is effective in preheating the slip stream 164, which is then fed to the regenerator 118. In such an embodiment, the regenerator reboiler duty can thereby be reduced; if the regenerator reboiler is heated by steam of higher pressure than the steam utilized in the stripper reboiler, the benefit is a reduction of high-pressure steam usage. Moreover, utilizing an overhead compressor allows use of the heat of condensation of the regenerator although the stripper is heated by low pressure steam. As mentioned above, when the ammonia stripper 140 is operated at low pressure, heat recovery such as this would not be possible as the condensation temperature of the stripper offgas stream 144 would be too low. By compressing the stripper offgas stream 144 in the compressor 150 to a higher pressure level, the heat from the stream 144' can be transferred to the slip stream 164 via the stripper overhead condenser 152. While operation of the compressor 150 increases the electricity demands of the system 100, this can be covered by the power produced by the electrical generator in the power plant. Moreover, the net output of electricity from the power plant can increase as the effect of using low pressure steam for operation of the stripper reboiler 146 is dominant.

Turning back now to FIG. 1, it can be seen that several of the concepts described herein can be utilized in a single gas purification system (100). As shown previously, heat is transferred from the regenerator 118 to the ammonia stripper 140 in order to cool the regenerator top and the stream of acidic component 122, while simultaneously heating the bottom of the stripper 140 and reducing the reboiler 146 heat duty through the use of LP steam. In addition, the stripper offgas stream 144 from the ammonia stripper 140 is compressed in compressor 150 to a higher pressure level so that the heat of condensation can be used on a higher temperature level. As shown in FIGS. 3 and 4, the heat of condensation from the overhead stripper condenser 152 can be used to heat a side stream 162 of the ammonia stripper 140 itself or a side stream 164 of the rich absorbent solution 164 for preheating the feed of the regenerator 118.

Figure 5:
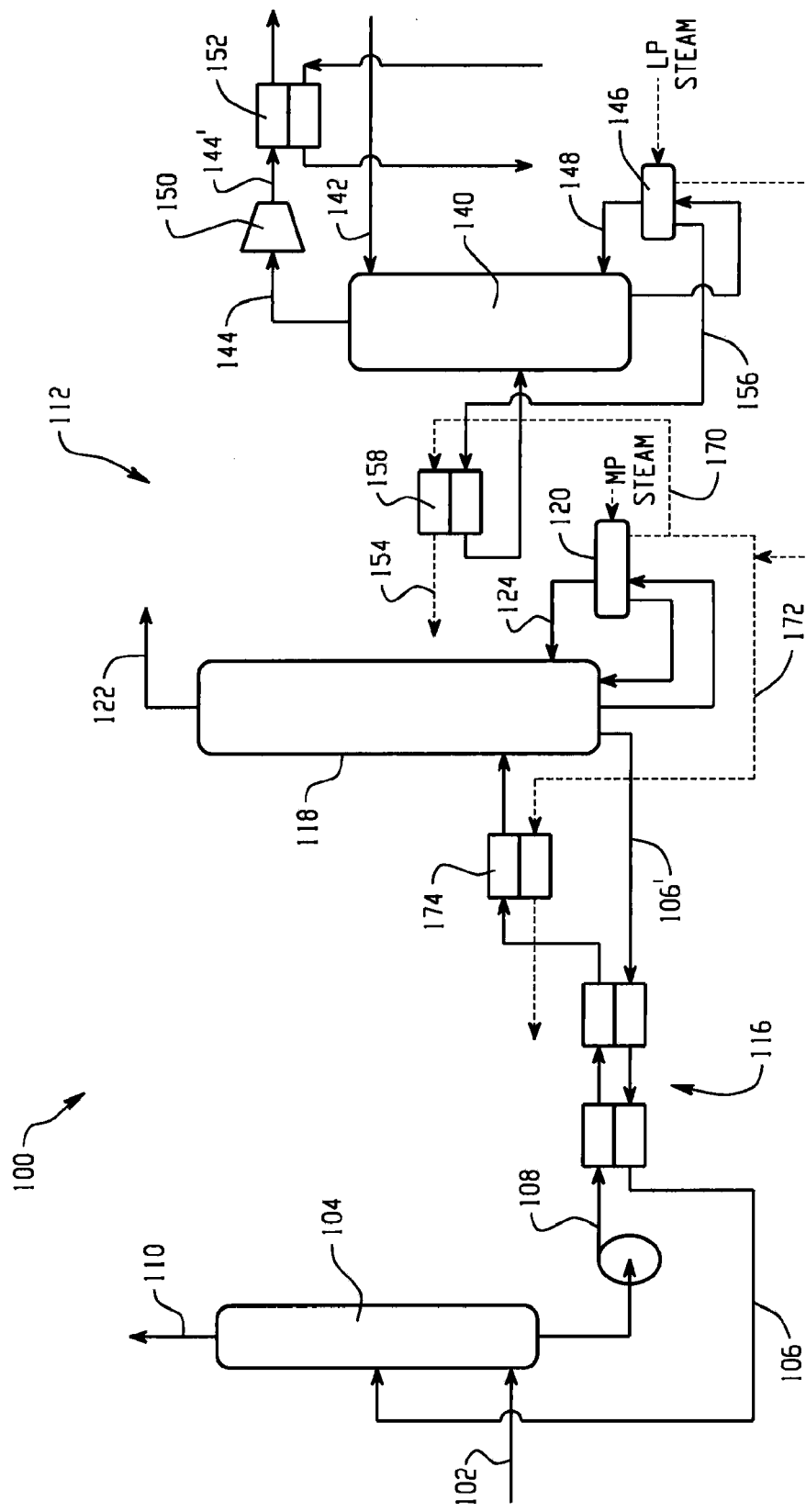
FIG. 5 schematically illustrates a gas purification system in accordance with an embodiment of the present invention.

In FIG. 5, yet another embodiment of the gas purification system 100 is illustrated. In this embodiment, rather than using heat that is shifted from the regenerator 118 to the stripper 140 via the side reboiler 158, the heat source for the side reboiler 158 can come from the condensate of the regenerator reboiler 120. As the temperature of the condensate coming from the reboiler 120 is significantly higher (and thus can provide a much larger amount of heat transfer) than the temperature of the liquid inside the lower part of the stripper column, the regenerator reboiler condensate can be utilized in the side-reboiler 158. As shown by the dashed lines in FIG. 5, a side draw 170 of the condensate from reboiler 120 can be fed to the side-reboiler 158 to heat up the liquid side draw 156 from any location of the stripper 140. The side draw 156 from the stripper may be partially vaporized. As shown, the condensate of reboiler 120 can optionally be split into two streams. Along with the side draw 170, the condensate can include a second stream 172 for preheating the regenerator feed in a heat exchanger 174. In still another embodiment (not shown), the side reboiler 158 can be arranged in series with the heat exchanger 174 and optionally the heat exchanger network 116, wherein the condensate is a heat source for both the stripper side draw 156 and pre-heating of the rich sorbent solution 108. As shown in the figure, the steam condensate from the stripper can be combined with the regenerator steam condensate and the combined steam condensate can be used to heat the process solutions in the side reboiler 158 and heat exchanger 174, thereby reducing the steam demand in the regenerator reboiler 120 and stripper reboiler 146.

As can be seen, the systems and processes for purification of a gas stream disclosed herein are uniquely configured to minimize the energy penalties associated with the use of low pressure steam from the power plant in the ammonia stripper of a carbon capture system through the use of strategic components and heat sources found elsewhere in the system.

The following examples are presented for illustrative purposes only, and are not intended to limit the scope of the invention.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for operating an ammonia stripper in a gas purification system, the process comprising:
   providing a first side-draw stream from the ammonia stripper;
   providing a condensate from a reboiler fluidly coupled to a regenerator;
   heating the first side-draw stream with the condensate in a side-reboiler fluidly coupled to the reboiler and the ammonia stripper;
   compressing a stripper offgas stream from the ammonia stripper;
   providing the compressed stripper offgas stream to a stripper overhead condenser; and
   utilizing the compressed stripper offgas stream as a heat source for a regenerating system fluidly coupled to the stripper overhead condenser.

2. The process of claim 1, further comprising heating a rich absorbent solution from an absorber with a portion of the condensate.

3. The process of claim 1, wherein utilizing the stripper offgas stream as the heat source comprises exchanging heat from the stripper offgas stream with a second side-draw stream from a bottom portion of the ammonia stripper.

4. The process of claim 3, wherein the second side-draw stream is partially vaporized in the stripper overhead condenser.

5. The process of claim 1, wherein utilizing the stripper offgas stream as the heat source comprises exchanging heat from the stripper offgas stream with a slip stream of rich absorbent solution from an absorber.

6. The process of claim 5, further comprising providing the heated slip stream to the regenerator.

* * * * *